No. 775,241. Patented November 15, 1904.

UNITED STATES PATENT OFFICE.

GEORGE K. HOLLISTER, JR., OF NEW YORK, N. Y.

ARTIFICIAL FUEL.

SPECIFICATION forming part of Letters Patent No. 775,241, dated November 15, 1904.

Application filed August 25, 1904. Serial No. 222,164. (No model.)

*To all whom it may concern:*

Be it known that I, GEORGE K. HOLLISTER, Jr., a citizen of the United States, and a resident of the city of New York, borough of Manhattan, in the county and State of New York, have invented a new and Improved Artificial Fuel, of which the following is a full, clear, and exact description.

My invention has for its object the utilization of waste coal material, such as is found about anthracite and bituminous coal mines and the various grades of lignite and other ligneous matter and the like, the fuel to be in the form of briquets and to be used for household, steam, or for any purpose where coal is used, to be practically clean, smokeless, and waterproof, to burn with a high rate of heat units, and to be ready for use within a short time after leaving the press or mold in which they are formed.

My artificial fuel consists of carbon in the form of small particles, which may be anthracite or bituminous culm, lignite, or other ligneous matter, or a blend of them, which I prefer, together with water, clay, or clay containing alum in the natural state, or a blend of them, or whiting, resin or pitch, or conifer resin or its resin pitch, or resin and pitch that has been carbonized by the action of an acid, preferably muriatic acid, a carbohydrate, or a mixture of carbohydrates, preferably a low-grade molasses and a salt of sulfur, preferably a soluble sulfate of iron and alum.

From experience I have found that oxidation of almost any mineral substance can be readily accomplished by subjecting said material in a pulverulent state to an incandescent temperature when in the presence of sufficient oxygen. It is therefore advisable when taking hard-coal particles as a base to mix with the same a small quantity of pulverulent soft coal, as when under pressure the softer and finer coal finds its way in between the hard-coal particles, thereby making a firm and solid briquet with far less chance of waste than if the briquet was made up of coarse particles alone, which is liable to fracture while under pressure, rendering the briquet fragile and of poor quality.

I have found that an excellent smokeless steam-coal can be made by a mixture of three-quarters of anthracite culm or screenings with one-quarter of a good coking-coal, and a fuel giving a high rate of heat units with a long flame may be produced by combining eighty per cent. of anthracite with twenty per cent. of a good coking gas-coal. In fact, varied proportions will produce for a long time a long flame.

In practicing my invention I take one ton of carbon particles such as described and mix with the same sixty-five pounds of dry clay in powder and forty-five pounds of resin in a fine state, the resin having been previously carbonized by the action of one-half gallon of muriatic acid with enough water to form a pulp, and while mixing, which may be by any suitable method, I add four gallons of molasses, having mixed in the same two pounds of sulfate of iron and two pounds of alum dissolved in water, continuing the mixing and spraying the mass with enough water to moisten the whole and molding the resulting mixture under high pressure into briquets of any desired shape or size. The briquets are to be baked for a short time, and I prefer to pass them through a heated tunnel of at least 350° Fahrenheit.

In a continuous routine baking the briquets renders the same extremely hard, with a slight shrinkage, and this important feature is apparently the result of the contracting power of the carbonized resin, in conjunction with the hardening action of the molasses, of which its coking quality has been altered by the sulfate of iron and alum, and although resin or pitch is meltable by heat resin or pitch is rendered unmeltable again in the briquet after the water has been evaporated while baking. The molasses enters into a peculiar combination with the carbonized resin in such a manner that a solid briquet with qualities described is the result.

If the briquets are to be used near where they are made and are not required to be so hard, the sulfate of iron and alum may be omitted, especially if those clays are used that contain alum in the natural state. The clay then may be dissolved in water and added to the molasses, taking the place of the sulfate of iron, and added to the mixture in the usual manner.

The special advantage that a binder of my invention has when combined with carbon particles and pressed into briquets and baked until hard and dry, is that such briquets when subjected to a high temperature will retain their shape and not disintegrate, because my binder when dry is capable of resisting the action of heat up to the point of ignition, and this is a very desirable feature in a briquet, for the same will stand up in the furnace for a long time and remain intact until completely consumed. My artificial fuel is therefore easily handled. Its hardness renders it clean to the touch, being free from dust, and reducing to a minimum the odor of gas while burning, as the free amount of oxygen in the fuel combining with the gas causes a blue flame. Thus nearly all the gas is consumed.

Spontaneous combustion in my artificial fuel in impossible, because every particle of coal being covered with the binder preserves all the gas. Therefore no heating value is lost by storage.

My process is therefore a simple process free from all those materials that go to make an artificial fuel so costly, thereby placing such processes beyond actual operation, and from demonstrations already given it has been proven that briquets made by my process are as good as the real article. Therefore it is possible by my process to utilize a large amount of coal waste or screenings and the like, that has always been an undesirable fuel.

In practicing my invention with anthracite culm or screenings, lignite coal, and the like I have found it expedient to modify to some extent the materials composing the binder, as more or less may be used, even to altering the method of mixing the same as the absorbent qualities of such coal may require, and I do not limit myself to the exact proportions given.

Having thus described my invention, I claim as new and desire to secure by Letters Patent—

1. As a new article of manufacture, an artificial-fuel briquet consisting of a carbon base, clay and a carbonized resin.

2. As a new article of manufacture, an artificial-fuel briquet consisting of a carbon base, clay, a carbonized resin and molasses.

3. As a new article of manufacture, an artificial-fuel briquet consisting of a carbon base, clay containing alum, a carbonized resin and molasses.

4. As a new article of manufacture, an artificial-fuel briquet consisting of a carbon base, clay, a carbonized resin, molasses, sulfate of iron and alum.

5. An artificial-fuel briquet, composed of carbon particles, water, clay, resin, an acid, a carbohydrate and alum, baked until hard and dry, substantially as described.

6. An artificial-fuel briquet, composed of carbon particles, water, clay, resin, muriatic acid, a carbohydrate, a sulfur salt and alum, baked until hard and dry, substantially as described.

7. An artificial-fuel briquet, composed of carbon particles, water, powdered clay, resin in a fine state, muriatic acid, a carbohydrate, a sulfur salt and alum, baked until hard and dry, substantially as specified.

8. As a new article of manufacture, an artificial-fuel briquet which consists of carbon particles mixed with clay, carbonized resin, a carbohydrate, a sulfur salt and alum, all baked until hard and dry, substantially as specified.

9. As a new article of manufacture, an artificial-fuel briquet which consists of carbon particles, clay, carbonized resin, carbohydrates, a sulfur salt and alum, baked until hard and dry, substantially as specified.

10. As a new article of manufacture, an artificial-fuel briquet composed of carbon particles, water, clay, resin, muriatic acid, carbohydrates, a sulfur salt and alum, baked until hard and dry, substantially as specified.

11. As a new article of manufacture, an artificial-fuel briquet composed of carbon particles, water, clay, resin, muriatic acid, molasses, sulfate of iron and alum and baked until hard and dry, substantially as described.

In testimony whereof I have signed my name to this specification in the presence of two subscribing witnesses.

GEORGE K. HOLLISTER, Jr.

Witnesses:
  ALFRED H. DAVIS,
  EVERARD BOLTON MARSHALL.